(12) United States Patent
Cline et al.

(10) Patent No.: US 7,754,020 B2
(45) Date of Patent: Jul. 13, 2010

(54) PROCESS WATER REUSE SYSTEM FOR LOW PH BINDERS

(75) Inventors: Harry B. Cline, Heath, OH (US); William E. Downey, Granville, OH (US); Liang Chen, New Albany, OH (US); William R. Cooper, Johnstown, OH (US)

(73) Assignee: Owens Corning Intellectual Capital, LLC. DE (US)

( * ) Notice: Subject to any disclaimer, the term of this patent is extended or adjusted under 35 U.S.C. 154(b) by 808 days.

(21) Appl. No.: 11/710,701

(22) Filed: Feb. 26, 2007

(65) Prior Publication Data

US 2007/0157675 A1 Jul. 12, 2007

Related U.S. Application Data

(63) Continuation-in-part of application No. 10/160,842, filed on May 31, 2002, now Pat. No. 7,185,516.

(51) Int. Cl.
*B08B 13/00* (2006.01)

(52) U.S. Cl. ............... 134/10; 134/18; 134/113; 134/111; 65/484

(58) Field of Classification Search ............... 134/10, 134/18, 113, 111; 65/484
See application file for complete search history.

(56) References Cited

U.S. PATENT DOCUMENTS

| | | | |
|---|---|---|---|
| 3,356,565 A | 12/1967 | Smucker et al. |
| 3,551,250 A | 12/1970 | Paoletti |
| 3,738,868 A | 6/1973 | Lancy |
| 3,767,605 A | 10/1973 | Gerlicher |
| 3,791,807 A | 2/1974 | Etzel et al. |
| 3,866,600 A | 2/1975 | Rey |
| 3,966,600 A | 6/1976 | Crowley et al. |
| 3,978,506 A | 8/1976 | Geyken et al. |

(Continued)

FOREIGN PATENT DOCUMENTS

GB     2 066 233     *  7/1981

(Continued)

OTHER PUBLICATIONS

Letter from Canadian Intellectual Property Office dated Dec. 14, 2009.

*Primary Examiner*—Frankie L Stinson
(74) *Attorney, Agent, or Firm*—James J. Dottavio; Jason S. Fokens

(57) ABSTRACT

A recovery system recycles the washwater used to clean excess binder and debris from the production components, including a forming hoodwall constructed of non-corrosive materials, for manufacturing fiberglass insulation. A separate closed-loop recovery system is provided for the forming hoodwall in which the binder-containing washwater is screened and then recycled back to the forming hoodwall without further chemical treatment to change the pH level. A binder reclamation system is coupled to the hoodwall washwater recovery system to divert the low pH washwater when the supply of binder needs replenished at the forming hoodwall. The binder reclamation system introduces an acid solution to the cleaned washwater to lower the pH from about 2.5 to about 3.5. The other production components share a bulk washwater recovery system in which a base solution is introduced to raise the pH to approximately 8 or above to reduce corrosion in the other production components.

20 Claims, 3 Drawing Sheets

U.S. PATENT DOCUMENTS

| | | | |
|---|---|---|---|
| 4,261,720 A | 4/1981 | Helbing | |
| 5,077,361 A | 12/1991 | Hughes et al. | |
| 5,294,686 A | 3/1994 | Fiarman et al. | |
| 5,318,990 A | 6/1994 | Strauss | |
| 5,340,868 A | 8/1994 | Strauss et al. | |
| 5,578,371 A | 11/1996 | Taylor et al. | |
| 5,646,207 A | 7/1997 | Schell | |
| 5,661,213 A | 8/1997 | Arkens et al. | |
| 5,670,585 A | 9/1997 | Taylor et al. | |
| 5,690,715 A | 11/1997 | Schiwek | |
| 5,718,728 A | 2/1998 | Arkens et al. | |
| 5,763,524 A | 6/1998 | Arkens et al. | |
| 5,770,555 A | 6/1998 | Weinstein | |
| 5,802,857 A * | 9/1998 | Radkowski et al. | 62/63 |
| 5,840,822 A | 11/1998 | Lee et al. | |
| 5,858,549 A | 1/1999 | Kielbania, Jr. et al. | |
| 5,866,664 A | 2/1999 | McCallum, III et al. | |
| 5,891,972 A | 4/1999 | Egraz et al. | |
| 5,932,109 A | 8/1999 | Griffin | |
| 5,932,665 A | 8/1999 | DePorter et al. | |
| 5,932,689 A | 8/1999 | Arkens et al. | |
| 5,977,224 A | 11/1999 | Cheung et al. | |
| 5,977,232 A | 11/1999 | Arkens et al. | |
| 6,136,916 A | 10/2000 | Arkens et al. | |
| 6,194,512 B1 | 2/2001 | Chen et al. | |
| 6,207,737 B1 | 3/2001 | Schell et al. | |
| 6,218,483 B1 | 4/2001 | Muthiah et al. | |
| 6,221,973 B1 | 4/2001 | Arkens et al. | |
| 6,241,780 B1 | 6/2001 | Arkens et al. | |
| 6,331,350 B1 | 12/2001 | Taylor et al. | |
| 6,454,873 B1 | 9/2002 | Mulligan et al. | |
| 2003/0221457 A1 | 12/2003 | Cline et al. | |
| 2003/0221458 A1 | 12/2003 | Cline et al. | |
| 2006/0198954 A1 * | 9/2006 | Frechem et al. | 427/212 |

FOREIGN PATENT DOCUMENTS

| | | |
|---|---|---|
| JP | 09 094598 | 8/1997 |
| WO | WO 99/61384 | 12/1999 |
| WO | WO 01/00699 | 1/2001 |

* cited by examiner

PROCESS WATER REUSE SYSTEM FOR LOW PH BINDERS

CROSS-REFERENCE TO RELATED APPLICATIONS

This application is a continuation-in-part of parent U.S. patent application Ser. No. 10/160,842, entitled "Washwater Neutralization System For Glass Forming Line" filed on May 31, 2002, the entire content of which is expressly incorporated herein by reference in its entirety.

TECHNICAL FIELD AND INDUSTRIAL APPLICABILITY OF THE INVENTION

The present invention relates generally to washwater systems for glass forming lines and more specifically to systems for reclaiming and reusing washwater utilized to clean production components used in the production of fiberglass insulation.

BACKGROUND OF THE INVENTION

In the fiberglass industry, washwater systems remove excess binder from the equipment used to form fiberglass insulation products. This allows the equipment to be operated at optimum efficiency to maximize glass throughput. The washwater equipment also prevents damage due to the buildup of binder, thereby limiting the amount of downtime associated with equipment cleaning, repair and replacement. This equipment includes but is not limited to forming conveyors, forming hoodwalls, suction boxes, drop out boxes, and forming fans.

Polycarboxylic acid based fiberglass binder resins have been used in the glass industry for insulation applications. Polycarboxylic acid based binders provide advantages in these applications in terms of mechanical properties and decreased reliance on environmental control equipment.

One problem with currently available washwater systems is that the polyacrylic acid binder, and hence the reclaim water, becomes acidic as the number of cycles of removing binder increases. This acidic reclaim water can corrode the walls of the forming and washwater equipment, which is typically made of carbon steel, thereby limiting the equipment's useful life. This results in added manufacturing costs due to equipment replacement and downtime. This also can result in decreased efficiency in the glass manufacturing process, resulting in increased manufacturing costs associated with rework and the like.

Various solutions have tried to address this corrosion problem. For example, stainless steel can replace carbon steel in the forming and washwater equipment due to its non-corrosive nature. However this equipment is expensive relative to carbon steel equipment.

Another solution proposed is to decrease the amount of cycles that reclaim water is introduced through the forming equipment. However, this also leads to increased costs in terms of water usage and wastewater removal. This also decreases the efficiency of the forming equipment associated with replacing the reclaim water.

It is thus highly desirable to improve the corrosion resistance of forming equipment and washwater equipment.

SUMMARY OF THE INVENTION

The present invention reduces the corrosion rate of forming and washwater equipment by controlling the pH to approximately 8.0 or above of reclaimed washwater used to clean the equipment and wash the uncured polyacrylic binder and fiberglass from the equipment.

To accomplish this, a washwater neutralizing system is introduced within the closed loop system to ensure that the washwater is maintained at a pH of approximately 8 and above. This is accomplished by coupling a pH probe to the inside of a washwater holding tank to monitor the pH of the washwater. If the pH is measured by the probe at below 8.0, a pump will introduce a quantity of the base solution, preferably a hydroxide solution, to the tank until the pH is raised to at least 8.0. This ensures that reclaim washwater, used to wash the uncured binder and fibers from the equipment, is maintained at a pH which limits corrosion of the equipment. This increases the useful life of the forming equipment and decreases manufacturing costs associated with repair and replacement of forming equipment due to acid corrosion.

In another preferred embodiment, a closed-loop hoodwall reclaim washwater system is introduced in addition to the washwater reclaim washwater system. The hoodwall reclaim washwater system pumps washwater from a separate washwater tank to remove excess polyacrylic acid binder from the hoodwalls of the forming area or may be used as makeup water for preparation of the aqueous binder. The closed-loop hoodwall reclaim washwater system is not coupled to the washwater neutralizing system, so the washwater that is reclaimed is substantially free of base solution. The reclaimed washwater may then be returned to a binder makeup tank for reuse, thereby reducing binder costs. Further, because the recovered binder is substantially base solution free, bound fiberglass containing the recovered binder experiences better and more consistant curing as compared with binders having small amount of base solution, as even small amounts of base solution within the binder can inhibit curing of the binder. Also, bound fiberglass products having substantially base solution-free binders have decreased degradation rates associated with water absorption caused by the presence of polyacrylic acids salts, degradation that affects the insulating properties such as recovery, stiffness, and R-value of these products. The second reclaim system would therefore minimize the amount of base solution in the binder makeup, thereby reducing curing problems associated with the base solution. The second reclaim system also increases the amount of recoverable binder, thereby decreasing binder costs.

In an alternate embodiment of the present invention, washwater containing binder utilized in forming the fiberglass insulation is removed from the hoodwall and is circulated through a closed loop system that is separate from a bulk washwater system used to reclaim washwater that cleans other components used in the manufacturing of fiberglass insulation products, such as a forming conveyor, suction boxes, drop out boxes, and forming fans. By keeping the pH binder-laden washwater from the forming hoodwall in a separate system from the bulk washwater, low pH binder may be reclaimed from the washwater and reused in the formation of fiberglass insulation products. In this exemplary embodiment, the forming hoodwall is constructed from a non-corrosive material, such as stainless steel, so that the low pH washwater can be recycled to clean the forming hoodwalls without having to be neutralized. In addition, maintaining the low pH of washwater from the forming hood allows the washwater to be diverted into a binder reclaim system where the pH is adjusted to below about 4.5, preferably between about 2.5 and about 3.5. The binder may then be recirculated to the forming hoodwall. The bulk washwater for the other components is neutralized with a base (such as NaOH) and recirculated to the other forming components.

It is an advantage of the above-described alternate embodiment of the present invention that the amount of base needed to raise the pH of the bulk washwater to approximately 8.0 is reduced.

It is a feature of the above-described alternate embodiment of the present invention that the reclamation of the low pH binder from the hoodwall washwater is more efficient by maintaining the hoodwall washwater within a separate closed loop system.

It is another advantage of the above-described alternate embodiment of the present invention that the pH of the hoodwall washwater can be adjusted in a binder reclaim tank to below about 4.5, and preferably between about 2.5 and about 3.5, through the introduction of an acid such as sulfuric acid.

It is another feature of this invention that hoodwall washwater can be recirculated back into the hoodwall for cleaning the forming hood without having to add a neutralizing base.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION AND PREFERRED EMBODIMENTS OF THE INVENTION

Figure 1:
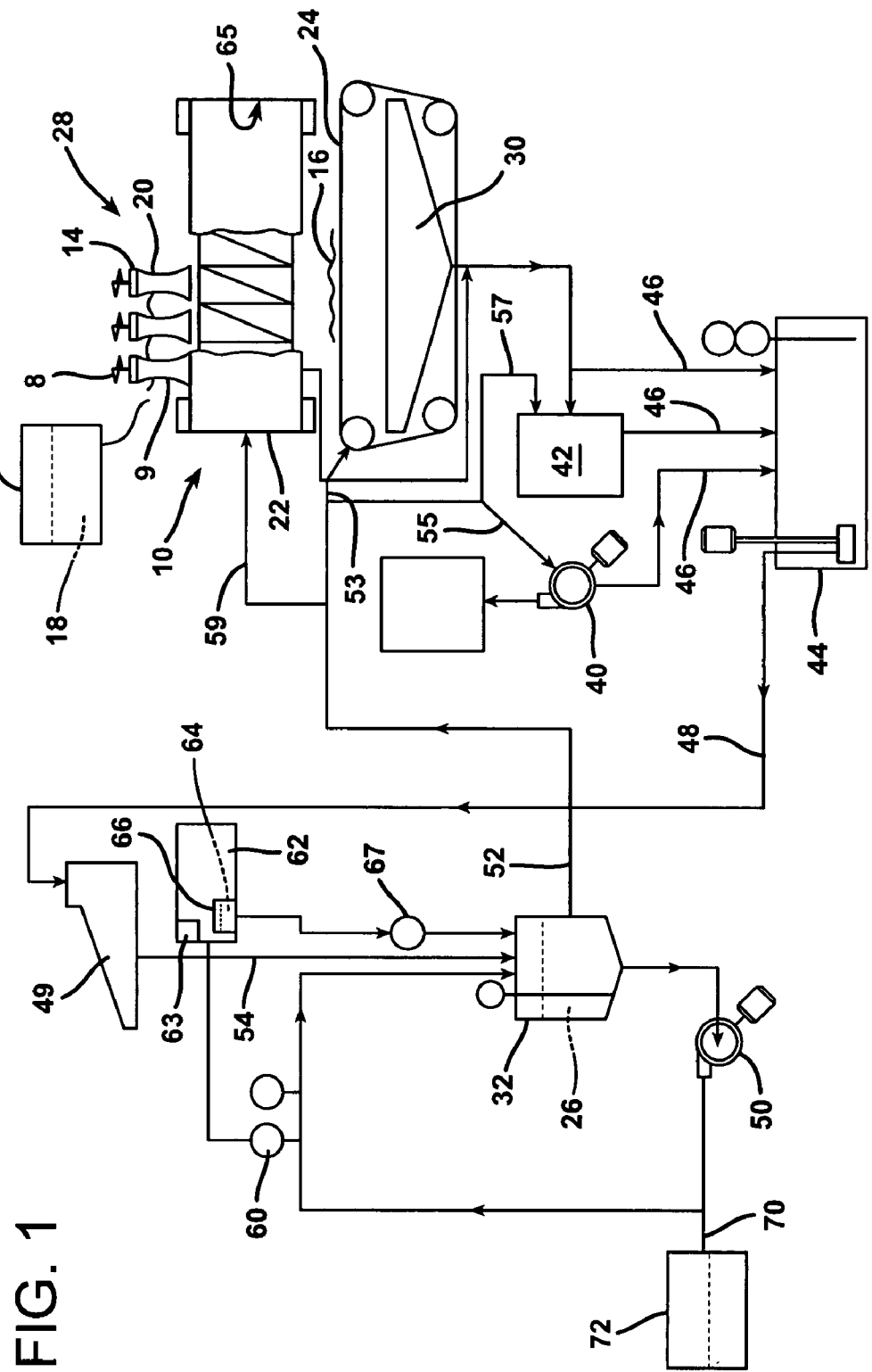
FIG. 1 illustrates a fiberglass forming line having a closed-loop washwater recovery system according to one exemplary embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. The terms "forming hoodwall", "forming hood", and "hoodwall" may be used interchangeably herein.

FIG. 1 illustrates a fiberglass forming line 10 having a closed-loop washwater recovery system 12 according to one preferred embodiment of the present invention.

Fiberglass is formed on the forming line 10 in a multistep process. Molten glass is first introduced from a furnace (not shown) through a bushing (not shown) to a spinner 14 that forms a plurality of fiberglass fibers 8 in a method well known in the art. A water-based polyacrylic binder 18 from a binder makeup tank 72 is sprayed onto the fibers 8 by a plurality of spaced nozzles (not shown) contained on a binder ring 20 to form an uncured binder coated fiber 9.

The polyacrylic acid binder 18 applied to the fibers 8 is conventional and includes polyacrylic acids having glycerol and triethanolamines as crosslinking groups. Suitable binders are disclosed in U.S. patent application Ser. No. 09/814,034 entitled "Low Odor Insulation Binder from Phosphite Terminated Polyacrylic Acid" filed Mar. 21, 2001, now U.S. Pat. No. 6,933,349 (issued Aug. 23, 2005); U.S. patent application Ser. No. 09/871,467 entitled "Surfactant-Containing Insulation Binder" filed May 31, 2001, now U.S. Pat. No. 7,157,524 (issued Jan. 2, 2007); and U.S. patent application Ser. No. 09/340,792 entitled "Corrosion Inhibiting Composition for Polyacrylic Acid Based Binders" filed Jun. 28, 1999, now U.S. Pat. No. 6,194,512, (issued Feb. 27, 2001), all of which are incorporated herein by reference in their entireties. Binder is diluted to a preferred application viscosity with water to approximately 3 to 25% solids.

The fibers 9 are then introduced through a forming hoodwall 22 that confines the fibers 9. The walls 65 of the hoodwall include a continuous moving belt that contains the fibers 8 and binder 18 within the forming hood. The fibers 9 are gathered onto a forming conveyor 24 by pulling a large volume of air across a series of perforated plates on the conveyor 24 using a forming fan 40. The fibers 9 form an uncured pack 16 on the forming conveyor 24. A drop out box 42 slows down the velocity of air between the conveyor 24 and forming fan 40 so that fibers 9 and binder 18 droplets which pass through the forming conveyor 24 are substantially prevented from reaching the forming fan 40.

The walls 65 of the forming hoodwall are washed with a washwater solution 26 introduced from a washwater tank 32 through a pump 50 and inlet line 52 to application devices 28 that pack walls 65 of the forming hoodwall 22 with the washwater solution 26. The washwater solution 26 removes excess binder 18 from the walls 65 of the forming hoodwall 22. The excess binder 18 and washwater solution 26 removed from the forming hoodwall 22 is collected and returned to the washwater tanks 32. The polyacrylic acid-coated uncured pack 16 is then moved along the conveyor 24 to an oven (not shown) for subsequent curing and processing to form glass fiber insulation products. The method for forming the glass pack 16, introducing the binder 18, and subsequent formation of fiberglass insulation products such as batts, rolls, blowing wool, and board products from the pack 16 is well-known in the art and is not relevant to the present invention except as directed to the closed-loop washwater recovery system 12 that is a subject of the present invention.

The washwater solution 26 is also introduced separately via input lines 53, 55, 57, 59 to remove excess binder 18 from the suction boxes 30, forming fan 40, drop out boxes 42, and forming hoodwall 22, respectively. This separate input of washwater solution 26 ensures clean surfaces and optimum performance of the equipment. The washwater solution 26 is then collected from the suction boxes 30, drop out boxes 42, forming fan 40, forming hoodwall 22, and conveyor 24 into a washwater sump 44 via input lines 46. The sump 44 pumps the washwater solution 26 and excess binder 18 via outlet line 48 to a shaker screen 49, in which glass fibers and partially cured particles of binder 18 are removed. The remaining washwater solution 26 that contains liquid binder 18 is returned to the washwater tank 32 via line 54.

The washwater tank 32 contains one or more pH probes 60 that provide electrical feedback to a processor 63 of a neutralization system 62. When the pH probe(s) 60 indicate that the pH of the washwater solution 26 is less than approximately 8.0, the processor 63 of the neutralization system 62 interprets an electrical signal from the pH probes 60 and directs the introduction of a base solution 64 into the washwater tank 32 through pump 67 from a holding tank 66 that is either contained within or coupled to the neutralization system 62. This coupling ensures that washwater solution 26 pumped through the closed-loop washwater recovery system 12 is maintained at a pH that will not corrode the forming conveyor 24, suction boxes 30, forming fan 40, drop out boxes 42, duct work (not shown), and environmental equipment (not shown).

Preferably, the base solution 64 comprises a weak acid/strong base salt that is soluble in water and can neutralize the washwater solution 26 without the production of insoluble salts. Further, the base solution should not buffer the washwater solution 26 to an extent that the washwater solution 26 may not be able to be removed from the washwater tank 32 and used to prepare phenolic binders. The base solution 64 may be solid sodium hydroxide or a solution of any available concentration. Preferably, a 50% by weight solution of sodium hydroxide dispersed in water is utilized as the base solution 64. It is to be appreciated that other hydroxide solutions such as calcium hydroxide or ammonium hydroxide may be used as the base solution 64. However, calcium hydroxide has limited solubility in water and insoluble salts tend to settle, which may cause pluggage problems. Ammonium hydroxide releases ammonia, and, as a result, environmental concerns in terms of plant emissions would have to be addressed.

Further, weak acid/strong base salts such as sodium bicarbonate can be used in the base solution 64. However, these salts are not preferred because they may not sufficiently buffer the washwater solution 26 and the washwater solution 26 may not be able to be removed from the washwater tank 32 and used to prepare phenolic binders.

The reclaimed washwater solution 26 containing the binder 18 may be siphoned from the tank 32 through line 70 and placed into a binder makeup tank 72. Here, the binder 18 may be recovered from the washwater solution 26 and reused in the application process. This reclamation of the binder 18 can reduce binder 18 costs and reduce the manufacturing costs for making insulation products.

By maintaining the washwater solution 26 at a pH of approximately 8.0 or above, the corrosion rate of the equipment utilized in forming the insulation product may be reduced, especially when compared with prior art systems that use a closed-loop washwater system without an associated neutralization system 62.

Figure 2:
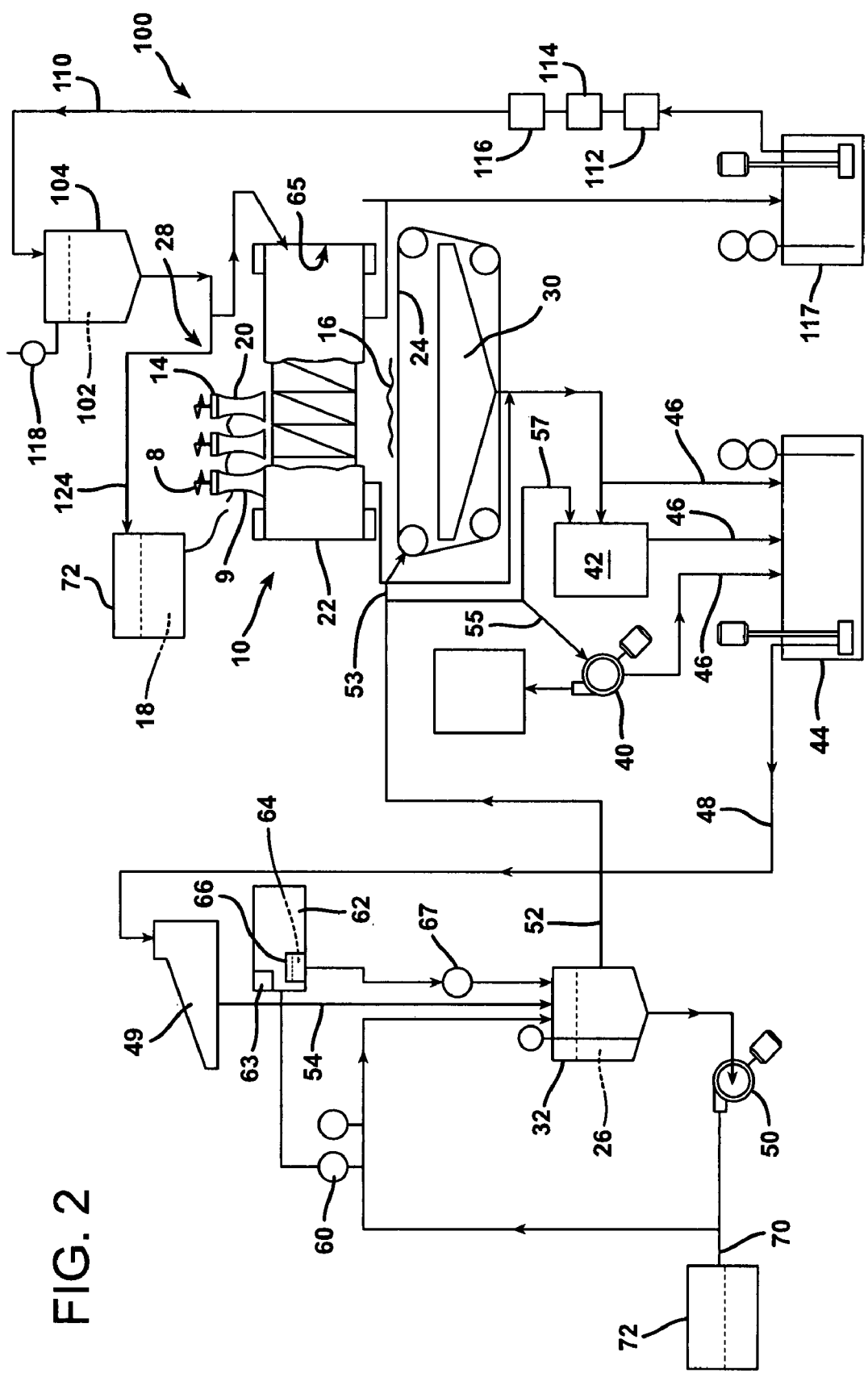
FIG. 2 illustrates a fiberglass forming line having a closed-loop washwater recovery system and a closed-loop hoodwall washwater recovery system according to another exemplary embodiment of the present invention.

In another preferred embodiment, as shown in FIG. 2, input line 59, which supplied washwater solution 26 to the walls 65 of the forming hoodwall 22 depicted in FIG. 1, is replaced with a closed-loop hoodwall washwater recovery system 100.

Referring now to FIG. 2, washwater solution 102 is introduced from a hoodwall reclaim recirculation tank 104 of the closed-loop hoodwall washwater recovery system 100 through a line 106 to the walls 65 of the forming hoodwall 22 to remove excess binder 18 that may have accumulated on the walls 106. The excess binder 18 and washwater solution 102 is then returned to the recirculation tank 104 via pump 117 through line 110 after passing through a series of filters 112 or a shaker screen(s) 114, or centrifuge 116, or a combination of all three as shown in FIG. 2. The filters 112, shaker screen(s) 114, and/or centrifuge 116 remove glass fibers and suspended, partially cured particles of binder 18 from the washwater solution 102 prior to a reintroduction of the washwater to the recirculation tank 104. Water may be introduced by a pump 118 to the tank 104 to replace water lost in the process. All wetted parts of the hoodwall reclaim system 100 should be stainless steel or contain a corrosion resistant material.

The reclaimed washwater solution 102 containing the binder 18 may be siphoned from the tank 104 through line 124 and placed into a binder makeup tank 72. Because the binder 18 is a water-based binder as described above, the binder 18 and the washwater solution 102 may be reused in the application process. This re-use can reduce binder 18 costs, which aids in minimizing the manufacturing costs for making insulation products.

The addition of a second closed-loop hoodwall washwater recovery system 100 offers certain advantages over the closed-loop washwater recovery system 12 illustrated in FIG. 1. For example, the second system 100 increases the amount of recoverable binder 18. In addition, the binder 18 that is recovered is substantially free of the base solution 64. As used here, the phrase "substantially free" is meant to indicate that the binder 18 is free or nearly free of base solution 63. This is important because the presence of base solution 64 adversely affects the curing of reclaimed binder 18 used in glass fiber products.

Further, by minimizing the amount of base solution 64 in the uncured pack 16, the amount of polyacrylic acid salt that may be contained in the finished insulation product made from the pack 16 is also minimized. This is important because polyacrylic acid salt increases the potential for water absorption within the finished insulation product, which may lead to an increase in the degradation of the insulation properties of the finished insulated product during storage and subsequent use.

Figure 3:
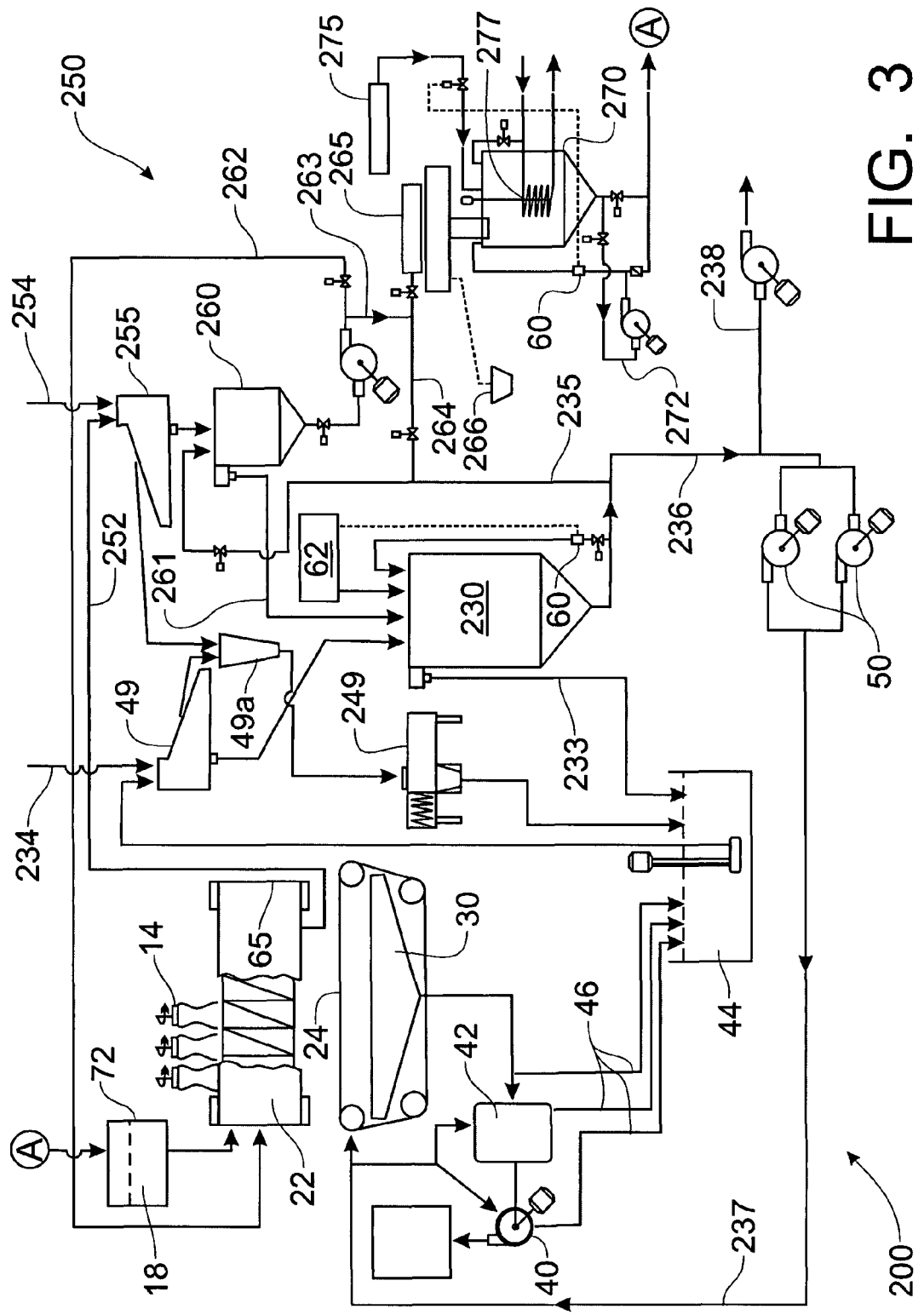
FIG. 3 illustrates a fiberglass forming line having a closed-loop washwater recovery system and a separate closed-loop hoodwall washwater recovery system according to yet another exemplary embodiment of the present invention.

In a further alternative embodiment of the invention, as shown in FIG. 3, the bulk washwater recovery system 200 recovers the washwater used to clean the components of the fiberglass insulation forming equipment other than the forming hoodwall 22. For example, the bulk washwater recovery system 200 is used to clean components such as the forming fan 40, the drop out boxes 42 and the suction boxes 30. Similar to the closed-loop washwater recovery system 12 described above, the washwater used to clean the forming fan 40, the drop out boxes 42 and the suction boxes 30 is collected into the washwater sump 44 via lines 46. The collected washwater is then pumped to one or more shaker screens 49 to remove larger debris particles (e.g., clumped or unclumped glass fibers 8) from the washwater. These large debris particles are collected in a scrap chute 49a and directed to a dewatering press 249. The recovered washwater is passed from the dewatering press 249 and back into the sump 44. The washwater passing through the shaker screen(s) 49 is directed into a washwater supply tank 230. One or more pH probes 60 are used to determine the pH of the washwater being discharged from the washwater supply tank 230 and, as is described in greater detail above, directs the introduction of a base solution 64, such as sodium hydroxide, into the washwater supply tank 230 to bring the pH of the washwater in the washwater supply tank 230 to approximately 8.0 or above to reduce (minimize) the corrosion of the forming fan 40, the drop out boxes 42 and the suction boxes 30.

Any overflow from the washwater supply tank 230 is directed by line 233 back to the sump 44. Any deficit of washwater in the system 200 can be replenished by the addition of water from an external source, such as by a well, by city water, or by a remote storage tank (not shown) through line 234. With the exception of line 235, which may be used to replenish the level of water in the hoodwall washwater recovery system 250, as will be described in greater detail below, the washwater is drawn from the washwater supply tank 230 by pumps 50 through line 236 and directed back to the forming fan 40, the drop out boxes 42, and the suction boxes 30 via line 237 to be reused to clean the equipment 30, 40, 42. Optionally, the bulk washwater can be pumped through line 238 to a remote storage tank (not shown).

The hoodwall washwater is recovered through a separate closed-loop recovery system 250 to keep the hoodwall washwater, which possesses a high concentration of low pH binder as a result of the cleaning operation in the forming hoodwall 22, from being combined with the bulk washwater in the bulk washwater recovery system 200. Thus, the amount of base solution that would have to be used to raise the pH of the bulk washwater in the washwater supply tank 230 to a pH of approximately 8.0 or more is reduced. In order to reduce or eliminate corrosion of the forming hoodwall 22 from the low pH hoodwall washwater, the walls 65 are preferably constructed of stainless steel or another non-corrosive metal, plastic (e.g., polypropylene or polyethylene), PVC (polyvinyl chloride) piping, or hard polyvinyl chloride (HPVC) piping.

The washwater used to clean the forming hoodwall 22 in the closed-loop recovery system 250 is collected and directed to a shaker screen 255 via line 252 where larger debris particles are separated from the hoodwall washwater and directed to a scrap chute 49a to be dewatered at 249, as described above with respect to the bulk washwater recovery system 200. The hoodwall washwater passing through the shaker screen 255 is directed into the hoodwall washwater collection tank 260. Any overflow from the hoodwall washwater collection tank 260 is directed via line 261 to the bulk washwater supply tank 230, and any shortage in the supply of water within the hoodwall washwater collection tank 260 can be replenished by one of several sources, such as the bulk washwater supply tank 230 via line 235, or from an external source, such as a well, city water, or a remote storage tank (not shown) through line 254.

The hoodwall washwater that is passed through the shaker screen 255 and into the collection tank 260 may be pumped directly back into the forming hoodwall 22 via line 262 without chemical treatment (e.g., the addition of a base or an acid). The non-corrosive construction of the forming hoodwall 22 allows the hoodwall washwater, which contains a low pH due to the inclusion of the low pH binder from cleaning the walls 65, to be returned for reuse in the cleaning operation. When the level of the binder 18 in the binder makeup tank 72 is low, some of the hoodwall washwater is diverted from line 262 into line 263 and placed into a centrifuge 265 that removes any remaining scrap fibers in the hoodwall washwater via centrifugal force to form cleaned hoodwall washwater. The scrap fibers obtained from centrifuging the hoodwall washwater are fed to a bin 266. The cleaned hoodwall washwater is then directed from the centrifuge 265 into a binder reclaim tank 270. The binder reclaim tank 270 has a level control that causes untreated hoodwall washwater to be diverted through line 263 and then into line 264 for return to the collection tank 260.

In the binder reclaim tank 270, the cleaned hoodwall washwater may be optionally cooled by chilled water passed through a cooling coil 277. The pH of the cleaned hoodwall washwater is determined by at least one pH probe 60 positioned within a test loop 272 that returns the cleaned hoodwall washwater to the binder reclaim tank 270. If the pH of the cleaned hoodwall washwater is above about 4.5, an acid solution, such as sulfuric acid, is passed (e.g., injected) from a storage tank 275 into the binder reclaim tank 270 to obtain a pH less than about 4.5, preferably from about 2.5 and about 3.5. In preferred embodiments, the pH of the cleaned hoodwall washwater is about 3.0. Once the pH of the hoodwall washwater being discharged from the binder reclaim tank 270 is below about 4.5, the treated discharge is sent to a binder mix tank (not shown) that is used to reclaim and supply binder to the binder make-up tank 72 to be sprayed onto the fibers 8 contained within the forming hoodwall 22. Alternative options to the direct input of sulfuric acid into the binder reclaim tank 270 from the acid solution storage tank 275 would be to inject the acid solution in-line within the test loop 272 or to use a static mixer (not shown) and monitor the pH to keep the pH below about 4.5.

In operation, the hoodwall washwater recovery system 250 maintains separation between the low pH binder-laden hoodwall washwater and keeps the hoodwall washwater from being mixed into the bulk washwater recovery system 200, which is neutralized by the addition of a base solution to reduce or prevent corrosion of the forming fan 40, the drop out boxes 42, and the suction boxes 30. Accordingly, the separation of the low pH hoodwall washwater from the bulk washwater recovery system 200 allows for a reduction in the amount of base solution added to the bulk washwater before being returned to the equipment 30, 40, 42. Further, the separation of the hoodwall washwater into a segregated closed-loop system and the construction of the forming hoodwall from non-corrosive materials allows the pH of the hoodwall washwater to remain at a low value for recirculated washing operations. In addition, the separation of the two systems 200, 250 reduces the amount of acid solution that needs to be added to the cleaned hoodwall washwater so that it may be used to replenish the binder used in the production of the fiberglass insulation products.

In the unlikely event that the level of hoodwall washwater in the collection tank 260 is in an overflow condition, the overflow of hoodwall washwater may be directed into the bulk washwater supply tank 230 where the hoodwall washwater would be treated with the base solution 64 by the neutralization tank 62 and converted into bulk washwater. Similarly, the introduction of water into either washwater recovery system 200, 250 introduces a water having a different pH than the washwater within the respective recovery system 200, 250. Although the addition of external water from line 254, or from the bulkwater supply tank 230 through line 235 into the hoodwall washwater recovery system 250 may raise the overall pH level of the hoodwall washwater, the higher pH would have no effect in the cleaning operation of the recirculated hoodwall washwater through line 262 and would be treated with the acid solution if diverted into the binder reclaim tank 270.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A washwater recovery system for a fiberglass product forming line including a first product forming component in which is utilized a low pH binder to produce said fiberglass product, a second production component, and low pH washwater cleaning system operable to remove binder and debris from said first product forming component and a bulk washwater cleaning system operable to clean said second production component, comprising:

a bulk washwater recovery loop operable to collect bulk washwater from said second production component for recycling and return to said second washwater cleaning system for cleaning said second production component, said bulk washwater recovery loop including:
  a first screening apparatus to remove large particles of debris from said bulk washwater and create screened bulk washwater;
  a bulk washwater supply tank to receive said screened bulk washwater from said first screening apparatus;
  a first pH probe operable to sense the pH level of said screened bulk washwater; and
  a neutralization system operably coupled to said first pH probe and being in flow communication with said bulk washwater supply tank to deliver a base solution thereto until said pH level of said cleaned bulk washwater is approximately 8 or above before being returned to said second washwater cleaning system; and
a low pH washwater recovery loop operable to collect low pH washwater from said first product forming component for recycling and return to said first washwater cleaning system for cleaning said first product forming component without treating said low pH washwater to change the pH level thereof.

2. The washwater recovery system of claim 1 wherein, said low pH washwater recovery loop includes:
  a second screening apparatus to remove large particles of debris from said low pH washwater and create screened low pH washwater; and
  a low pH washwater collection tank to receive said screened low pH washwater from said second screening apparatus, said screened low pH washwater being returned to said first product forming component without treating said screened low pH washwater to change the pH level thereof.

3. The washwater recovery system of claim 2, wherein said low pH washwater recovery loop includes a return line from said low pH washwater collection tank to said first product forming component, said low pH washwater recovery loop further including:
  a binder reclamation apparatus in flow communication with said return line to divert screened low pH washwater from said return line to said binder reclamation apparatus.

4. The washwater recovery system of claim 3, wherein said binder reclamation apparatus comprises:
  a washwater cleaning device receiving said screened low pH washwater from said return line and creating a cleaned low pH washwater by removing remaining debris therein;
  a binder reclaim tank to receive said cleaned low pH washwater from said washwater cleaning device;
  a second pH probe to determine the pH level of said cleaned low pH washwater;
  an acid storage tank in flow communication with said binder reclaim tank to add an acid solution to said cleaned low pH washwater when said pH level thereof is greater than about 4.5; and
  a discharge line from said binder reclaim tank operable to forward said cleaned low pH washwater to a binder makeup tank when said pH level of said cleaned low pH washwater is lower than 4.5.

5. The washwater recovery system of claim 4, wherein said discharge line from said binder reclaim tank is operable to return said cleaned low pH washwater to said binder reclaim tank when the pH of said cleaned low pH washwater is greater than about 4.5.

6. The washwater recovery system of claim 4 wherein said washwater cleaning device is a centrifuge.

7. The washwater recovery system of claim 4, wherein said low pH washwater recovery loop is operable to receive a supply of screened bulk washwater from said bulk washwater recovery loop when additional supplies of water are necessary in said low pH washwater recovery loop.

8. The washwater recovery system of claim 7, wherein said first product forming component is a forming hoodwall operable to produce a fiberglass insulation product, said second production component includes a forming conveyor, a drop out box, and a forming fan.

9. The washwater recovery system of claim 8, wherein said low pH washwater collection tank includes an overflow line that directs any overflow in said low pH washwater collection tank into said bulk washwater supply tank to be neutralized by said neutralization system and made a part of said screened bulk washwater.

10. The washwater recovery system of claim 8 wherein said forming hoodwall is constructed from non-corrosive materials.

11. A fiberglass insulation forming line comprising:
  a forming hoodwall operable to combine a low pH binder and glass fibers to form said fiberglass insulation, said forming hoodwall being cleaned with a first washwater to remove excess low pH binder and debris from said forming hoodwall;
  additional production components, including a forming fan, a suction box and a drop out box, cooperable with said forming hoodwall in the formation of said fiberglass insulation, said additional production components being cleaned with a second washwater to remove debris therefrom;
  a bulk washwater recovery system to collect said second washwater after being used to clean said additional production components, including:
    a first screening apparatus to remove large particles of debris from said second washwater and create screened bulk washwater;
    a bulk washwater supply tank to receive said screened bulk washwater from said first screening apparatus;
    a first pH probe operable to sense the pH level of said screened bulk washwater; and
    a neutralization system operably coupled to said first pH probe and being in flow communication with said bulk washwater supply tank to deliver a base solution thereto until said pH level of said screened bulk washwater is greater than or approximately 8.0 before being returned to said additional production components; and
  a hoodwall washwater recovery system to collect said first washwater after being used to clean said forming hoodwall, including:
    a second screening apparatus to remove large particles of debris from said first washwater and create screened first washwater; and
    a hoodwall washwater collection tank to receive said screened first washwater from said second screening apparatus, said screened first washwater being returned through a return line to said forming hoodwall without treating said screened first washwater to change the pH level thereof.

12. The forming line of claim 11, wherein said hoodwall washwater recovery system further comprises a binder reclamation apparatus comprising:
- a washwater cleaning device receiving said screened first washwater from said return line and creating a cleaned first washwater by removing debris remaining therein;
- a binder reclaim tank to receive said cleaned first washwater from said washwater cleaning device;
- a second pH probe to determine the pH level of said cleaned first washwater;
- an acid storage tank in flow communication with said binder reclaim tank to add an acid solution to said cleaned first washwater when said pH level thereof is greater than about 4.5; and
- a discharge line from said binder reclaim tank operable to forward said cleaned low pH washwater to a binder makeup tank when said pH level of said cleaned low pH washwater is lower than 4.5.

13. The forming line of claim 12, wherein said discharge line from said binder reclaim tank is operable to return said cleaned first washwater to said binder reclaim tank when the pH thereof is greater than about 4.5.

14. The forming line of claim 12 wherein said washwater cleaning device is a centrifuge.

15. The forming line of claim 14, wherein said hoodwall washwater recovery loop is operable to receive a supply of screened bulk washwater from said bulk washwater recovery loop when additional supplies of water are necessary in said hoodwall washwater recovery loop.

16. A method of recovering washwater used to clean production components used in the manufacture of fiberglass insulation, said production components including a forming hoodwall in which a low pH binder is used with glass fibers to form a fiberglass blanked and other related production components, the method comprising the steps of:
- providing a bulk washwater recovery loop to receive a first washwater used to clean debris from said additional production components and a separate hoodwall washwater recovery loop to receive a second washwater used to clean excess binder and debris from said forming hoodwall;
- screening said first washwater to create a screened first washwater;
- introducing a quantity of base solution from a holding tank of a neutralization system sufficient to raise the pH of said screened first washwater approximately 8 or above when the pH of said screened first washwater is determined by a pH probe to be below approximately 8.0;
- returning said screened first washwater to said additional production components for continued use in cleaning debris therefrom; and
- screening said second washwater to create a screened second washwater; and
- recycling said screened second washwater to said forming hoodwall for use in cleaning excess binder and debris therefrom without further treatment of said screened second washwater to change the pH level thereof.

17. The method of claim 16, further comprising the steps of:
- diverting a portion of said screened second washwater into a binder reclamation apparatus; and
- introducing a quantity of acid solution into said screened second washwater to lower the pH level thereof below approximately 4.5 to create a treated second washwater when said pH level of said screened second washwater is determined to be above approximately 4.5; and
- utilizing said treated second washwater to replenish a supply of said low pH binder at said forming hoodwall.

18. The method of claim 17, further comprising the steps of:
- cleaning said screened second washwater with a centrifuge after said diverting step to create a cleaned second washwater; and
- collecting said cleaned second washwater in a binder reclaim tank where said step of introducing a quantity of acid solution is accomplished.

19. The method of claim 18, wherein said diverting step is accomplished when said supply of binder at said forming hoodwall is determined to be reduced to a predetermined level.

20. The method of claim 19, wherein said bulk washwater recovery loop includes a supply line operably connected to said hoodwall washwater recovery loop to provide a supply of screened bulk washwater into said hoodwall washwater recovery loop when low levels of first washwater is sensed in said hoodwall washwater recovery loop.

* * * * *